Figure 1:
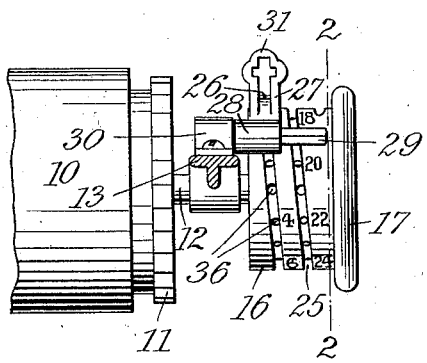
Figure 2:
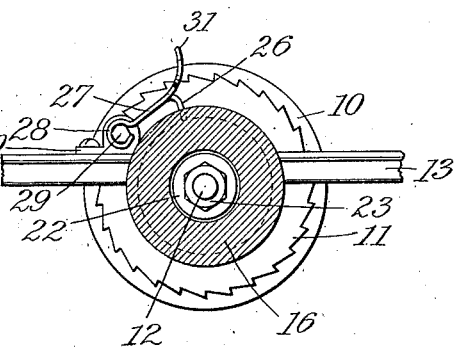
Figure 3:
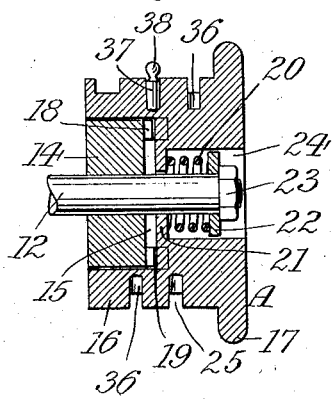
Figure 4:
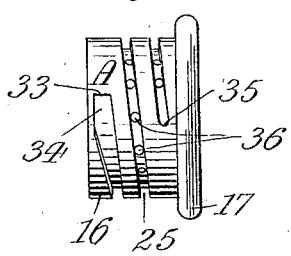
Figure 5:
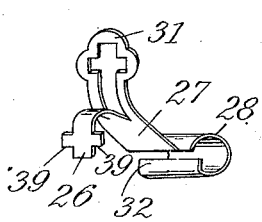
Figure 6:
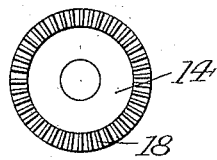

A. E. ZUMPE.
TYPE WRITER PLATEN CHECKING DEVICE.
APPLICATION FILED OCT. 12, 1910.

983,340. Patented Feb. 7, 1911.

Witnesses:

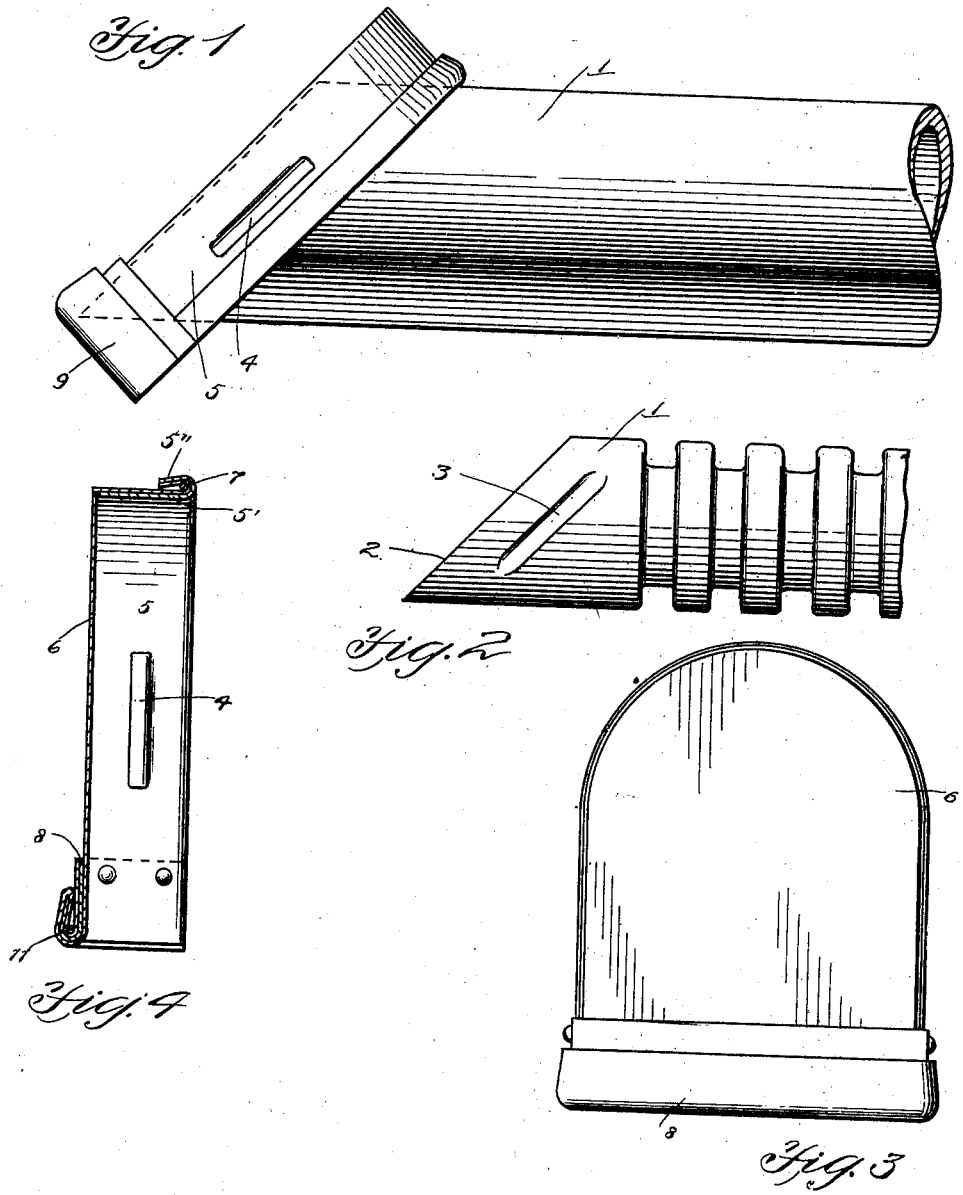

Inventor
Arthur E. Zumpe.